United States Patent
Redmann

(10) Patent No.: US 12,356,039 B2
(45) Date of Patent: Jul. 8, 2025

(54) SYSTEMS, DEVICES AND METHODS TO ENHANCE DELIVERY AND PRESENTATION OF CONTENT

(71) Applicant: InterDigital Madison Patent Holdings, SAS, Paris (FR)

(72) Inventor: William Redmann, Glendale, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/008,804

(22) PCT Filed: Jun. 8, 2021

(86) PCT No.: PCT/US2021/036337
§ 371 (c)(1),
(2) Date: Dec. 7, 2022

(87) PCT Pub. No.: WO2021/252447
PCT Pub. Date: Dec. 16, 2021

(65) Prior Publication Data
US 2023/0217066 A1    Jul. 6, 2023

Related U.S. Application Data

(60) Provisional application No. 63/037,426, filed on Jun. 10, 2020.

(51) Int. Cl.
*H04N 21/4402* (2011.01)
*H04N 21/45* (2011.01)
*H04N 21/482* (2011.01)

(52) U.S. Cl.
CPC . *H04N 21/440218* (2013.01); *H04N 21/4532* (2013.01); *H04N 21/482* (2013.01)

(58) Field of Classification Search
CPC ............. H04N 21/482; H04N 21/4532; H04N 21/440218
See application file for complete search history.

(56) References Cited

U.S. PATENT DOCUMENTS 8,359,322 B2 * 1/2013 Yamamoto ......... H04N 21/4661
725/39
2003/0093260 A1 5/2003 Dagtas et al.
(Continued)

FOREIGN PATENT DOCUMENTS

CA    2887653 A1 *   4/2014    ......... H04L 41/5058

OTHER PUBLICATIONS

DVB Organization, A332-20179 Service Announcement 2 PDF. DVB, Digital Video Broadcast, Aug. 3, 2018, 21 Pages.
(Continued)

*Primary Examiner* — James R Sheleheda
(74) *Attorney, Agent, or Firm* — Condo Roccia Koptiw LLP

(57) ABSTRACT

Selection of a content presentation can involve obtaining a message representative of a plurality of terms including a first term and a second term, wherein the first term indicates a first capability required for a first content presentation and the second term indicates a second capability required for a second content presentation; and enabling selection of a content presentation from among at least the first and second content presentations available based on a content signal, wherein the selection is based on the message.

20 Claims, 4 Drawing Sheets

(56) References Cited

U.S. PATENT DOCUMENTS

| | | | |
|---|---|---|---|
| 2003/0097657 A1 | 5/2003 | Zhou et al. | |
| 2005/0097606 A1 | 5/2005 | Scott et al. | |
| 2007/0050196 A1* | 3/2007 | Jadhav | G06Q 99/00 |
| | | | 725/139 |
| 2010/0037258 A1* | 2/2010 | Chitturi | H04N 21/23431 |
| | | | 725/39 |
| 2011/0023065 A1* | 1/2011 | Edlund | H04N 21/25891 |
| | | | 725/51 |
| 2011/0041065 A1* | 2/2011 | Bangma | H04N 21/41407 |
| | | | 715/733 |
| 2011/0258665 A1* | 10/2011 | Fahrny | H04N 21/4516 |
| | | | 725/47 |
| 2017/0085958 A1* | 3/2017 | Choi | H04N 21/438 |
| 2017/0099523 A1* | 4/2017 | Kwak | H04N 21/43 |
| 2017/0118503 A1* | 4/2017 | Deshpande | H04N 21/4382 |
| 2017/0127115 A1* | 5/2017 | Lee | H04N 21/4126 |
| 2017/0250771 A1* | 8/2017 | Deshpande | H04H 20/38 |
| 2018/0041810 A1* | 2/2018 | Deshpande | H04N 21/4363 |
| 2018/0139001 A1* | 5/2018 | Yang | H04L 67/02 |
| 2020/0162768 A1* | 5/2020 | Cho | H04N 21/41415 |

OTHER PUBLICATIONS

ATSC, "ATSC Standard: Service Announcement Doc. A/332:2017", Advanced Television Systems Committee, Washington, DC, Dec. 6, 2017, 34 pages.

ETSI TS 103 190-2 V1.2.1, "Digital Audio Compression (AC-4) Standard, Part 2: Immersive and personalized audio", European Telecommunication Standards Institute (ETSI), Feb. 2018, 250 pages.

ETSI TS 103 433-1 V1.4.1, "High-Performance Single Layer High Dynamic Range (HDR) System for use in Consumer Electronics devices, Part 1: Directly Standard Dynamic Range (SDR) Compatible HDR System (SL-HDR1)", European Telecommunications Standards Institute (ETSI), Aug. 2021, 136 pages.

ETSI TS 103 589 V1.1.1, "Higher Order Ambisonics (HOA) Transport Format", European Telecommunications Standards Institute (ETSI), Jun. 2018, 33 pages.

ITU-R, "Image Parameter Values for High Dynamic Range Television for Use in Production and International Programme Exchange", Recommendation ITU-R BT.2100-0, BT Series, Broadcasting Service (Television), Jul. 2016, 17 pages.

ITU-R, "ITU-R BT.709-5—Parameter Values for the HDTV Standards for Production and International Programme Exchange", International Telecommunications Union Radiocommunications Sector, Apr. 2002, pp. 1-32.

ITU-R, "Parameter Values for Ultra-high Definition Television Systems for Production And International Programme Exchange", Recommendation ITU-R BT.2020-1, BT Series Broadcasting service (television), Jun. 2014, 8 pages.

ITU-T, "High Efficiency Video Coding", Recommendation ITU-T H.265, Series H: Audiovisual and Multimedia Systems, Infrastructure of Audiovisual Services—Coding of Moving Video, Apr. 2013, 317 pages.

TS 103 572 V1.1.2, "HDR Signalling and Carriage of Dynamic Metadata for Colour Volume Transform, Application #1 for DVB Compliant Systems", European Telecommunication Standards Institute (ETSI), Jul. 2018, pp. 1-16.

* cited by examiner

300

Input

↓

310 obtaining a message including a capabilities expression comprising a plurality of capabilities terms, wherein each capabilities term corresponds to one of a plurality of presentation modes for presenting a content, and each capabilities term includes a plurality of capabilities tokens, wherein each capabilities term indicates, based on the plurality of capabilities tokens, a requirement for presenting the content in accordance with a corresponding one of the plurality of presentation modes

↓

320 compressing the capabilities expression to reduce at least one of a number of the capabilities terms or a number of the capabilities tokens included in the capabilities expression, wherein the compression is based on including at least one of an operator or an intensifier in the message, and wherein the message and the compressed capabilities expression enables determining one of the plurality of presentation modes for presenting a content

SYSTEMS, DEVICES AND METHODS TO ENHANCE DELIVERY AND PRESENTATION OF CONTENT

CROSS REFERENCE TO RELATED APPLICATIONS

This application is a U.S. National Stage Application under 35 U.S.C. § 371 of International Patent Application No. PCT/US2021/036337, filed 8 Jun. 2021, which is incorporated herein by reference in its entirety.

This application claims the benefit of U.S. provisional patent application No. 63/037,426 filed 10 Jun. 2020, which is incorporated by reference herein in their entirety.

TECHNICAL FIELD

The present disclosure involves content delivery systems, devices and methods.

BACKGROUND

Systems for delivering and presenting content typically process signals in accordance with a particular standard to ensure compatibility and a seamless user experience. An example of such a standard is the ATSC 3.0 digital television signal standard. In addition to content included in a signal, such as video and audio associated with content including television programming, movies, music, etc., a signal created in accordance with a standard usually includes control information that may relate to a system being able to transmit and/or receive content. The control information may also relate to implementing user interface features such as an electronic program guide. For ease of explanation, the description of the present disclosure and the examples of embodiments described herein will be provided in the context of the example of ATSC 3.0. However, as will be apparent to one skilled in the art, aspects, features and embodiments described herein are also applicable to other standards and systems.

An example of the control information mentioned above comprises an ATSC 3.0 program and services announcement, per ATSC 3.0 A/332. These announcements or messages indicate capabilities needed for a system to render each of the one or more meaningful presentations of a content (e.g., a TV show, movie, application). The announcements include a variety of tokens or codes that are combined in an expression created based on a grammar for the expressions. For example, an A/332 capabilities expression can be expanded, if not already in such form, by the distributive property of conjunction over disjunction, to one or more "capability terms", or just "terms", the terms, each a conjunction (e.g., two or more codes logically connected by "and" such as "A and B"), and all terms separated by disjunction (e.g., two or more terms logically connected by "or" such as "(A and B) or (C and D)", such that each term represents the capability requirements for a different meaningful presentation of the content offered. Thus, a term may also be referred to herein as a "capabilities term".

SUMMARY

In general, at least one example of an embodiment described herein can involve a method comprising: obtaining a message representative of a plurality of terms including a first term and a second term, wherein the first term indicates a first capability required for a first content presentation and the second term indicates a second capability required for a second content presentation; and enabling selection of a content presentation from among at least the first and second content presentations available based on a content signal, wherein the selection is based on the message.

In general, at least one example of an embodiment described herein can involve apparatus comprising: one or more processors configured to obtain a message representative of a plurality of terms including a first term and a second term, wherein the first term indicates a first capability required for a first content presentation and the second term indicates a second capability required for a second content presentation; and enable selection of a content presentation from among at least the first and second content presentations available based on a content signal, wherein the selection is based on the message.

In general, at least one example of an embodiment described herein can involve a method comprising: determining a first capability required for a first content presentation and a second capability required for a second content presentation; and producing a message to enable selection of a content presentation from among at least the first and second content presentations available based on a content signal, wherein the message is representative of a plurality of terms including a first term and a second term, and wherein the first term indicates the first capability required for the first content presentation and the second term indicates the second capability required for the second content presentation.

In general, at least one example of an embodiment described herein can involve apparatus comprising: one or more processors configured to determine a first capability required for a first content presentation and a second capability required for a second content presentation; and produce a message to enable selection of a content presentation from among at least the first and second content presentations available based on a content signal, wherein the message is representative of a plurality of terms including a first term and a second term, and wherein the first term indicates the first capability required for the first content presentation and the second term indicates the second capability required for the second content presentation.

In general, at least one example of an embodiment described herein can involve a method comprising: obtaining a message including a capabilities expression comprising a plurality of capabilities terms, wherein each capabilities term corresponds to one of a plurality of presentation modes for presenting a content, and each capabilities term includes at least one capabilities token, wherein each capabilities term indicates, based on the at least one capabilities token, a requirement for presenting the content in accordance with a corresponding one of the plurality of presentation modes; compressing the capabilities expression based on reducing a number of the capabilities terms or a number of the capabilities tokens included in the capabilities expression; and determining, based on the message and the compressed capabilities expression, one of the plurality of presentation modes for presenting a content.

In general, at least one example of an embodiment described herein can involve apparatus comprising: one or more processors configured to obtain a message including a capabilities expression comprising a plurality of capabilities terms, and each capabilities term corresponds to one of a plurality of presentation modes for presenting a content, and each capabilities term includes at least one capabilities token, wherein each capabilities term indicates, based on the at least one capabilities token, a requirement for presenting the content in accordance with a corresponding one of the plurality of presentation modes; enable a compression of the capabilities expression to reduce a number of the capabilities terms or a number of the capabilities tokens included in the capabilities expression; and determine, based on the message and the compression of the capabilities expression, one of the plurality of presentation modes for presenting a content.

In general, at least one example of an embodiment described herein can involve a method comprising: determining whether a content can be presented by a device based on a capabilities announcement indicating a first set of first capabilities required for a first presentation of the content, and based on a set of capabilities of the device, wherein the first presentation can be presented by the device if the set of capabilities of the device includes each of the first set of capabilities and not otherwise; and enabling selection of the content based on determining the first presentation can be presented.

In general, at least one example of an embodiment described herein can involve apparatus comprising: one or more processors configured to determine whether a content can be presented by a device based on a capabilities announcement indicating a first set of first capabilities required for a first presentation of the content, and based on a set of capabilities of the device, wherein the first presentation can be presented by the device if the set of capabilities of the device includes each of the capabilities included in the first set of first capabilities and not otherwise; and enable selection of the content based on determining that the first presentation can be presented.

In general, at least one example of an embodiment as described herein provides a computer program product having stored thereon program instructions that, when executed by one or more processors, perform a method in accordance with one or more aspects and/or examples of embodiments described herein; and/or a non-transitory computer readable medium storing executable program instructions to cause a computer executing the instructions to perform a method according to any example of an embodiment in accordance with the present disclosure; and/or an electronic device including apparatus as described herein and one or more additional features such as a display or antenna, etc.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWING

The present disclosure may be better understood by considering the detailed description below in conjunction with the accompanying figures, in which:

FIG. 3 illustrates, in flow diagram form, another example of an embodiment; and

Figure 1:
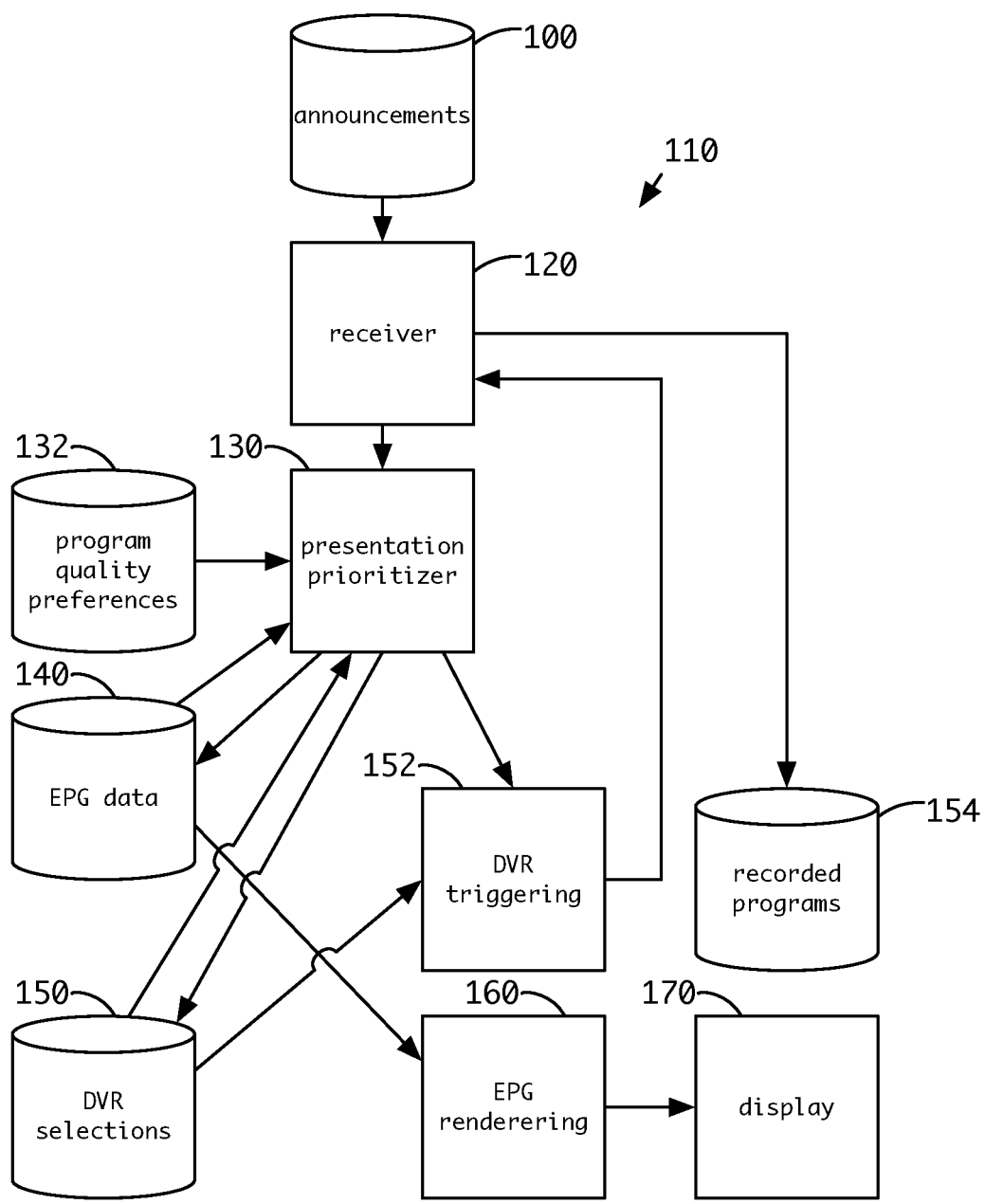
FIG. 1 illustrates, in block diagram form, an example of an embodiment.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION

In general, at least one example of an embodiment described herein involves improving the ability of A/332 and similar grammars relating to capabilities to convey additional information about different meaningful presentations, e.g., by providing additional information such as extensions to the grammar. The additional information can include enabling a capability in the system to convey information regarding, and providing an awareness of, differing levels of performance of systems and degrees to which such different meaningful presentations exploit various levels of performance, all while retaining backward compatibility with devices not recognizing the extensions. This allows an enhanced user experience as the user's expectations of the presentation to be received can be more accurately set and improved implementations of the user's preferences which become more accurately expressible and followable.

As a more specific example, in ATSC 3.0 A/332, the hexadecimal capability code "0x050A" is a token herein referred to as an "HDR token". This example of a token represents a required capability of a device to properly decode a content that is encoded using one of the high dynamic range (HDR) video transfer functions PQ or HLG and the color primaries of the BT.2100 color space all of which are described in ITU-R BT.2100. ITU-R BT.2100 specifies the same color space as ITU-R BT.2020, both of which allow representation of images using a wide color gamut (WCG).

These capabilities are distinct from those described in ITU-R BT.709, which represents the standard dynamic range (SDR) transfer function and considerably smaller BT.709 color space or 'standard color gamut' (SCG). It might be noted that ITU-R BT.2020, while offering WCG, remained limited to the SDR transfer function.

In ATSC 3.0 A332, a capability code represented by the HDR token can be used in a program announcement to signal that a receiver must be able to decode such transfer functions and understand the color gamut in order to make a correct picture. This allows a device in receipt of such an announcement to determine whether such announcement represents a program that can be correctly displayed and thus should be offered to a viewer for immediate selection or later recording, or if the program should not appear among the choices offered to the user, or selections made available to other processes (e.g., the schedule for digital video recording).

In another application, a content receiver such as a mobile device (e.g., smartphone or tablet), set-top box, digital television, or display device might use the HDR token to signal to a content source. For example, a content receiver might signal to a content provider, e.g., another device able to provide content or other content provider (e.g., headend or cloud) by wired connection (e.g., HDMI) or wireless connection (e.g., Bluetooth or Wi-Fi), that the content receiver has the capability to interpret ITU-R BT.2100 encoded contents, and so such contents should be considered.

ATSC 3.0 A332 provides a grammar for a capabilities expression that allows tokens to be combined to represent capabilities required to render one or more possible presentations of a content stream, the 'meaningful presentations. A device can evaluate such an expression and determine whether or not it is able to support one or more of the possible presentations.

In the following text, various video technologies are referenced, but only briefly described. Among these are:
HEVC encoding as defined in ITU-T H.265, as is SHVC.
SL-HDR1 metadata and HDR reconstruction as defined in ETSI TS 103 433-1
2094-10 metadata for HDR manipulation as defined in ETSI TS 103 572
MPEG-H encoding for audio as defined in ETSI TS 103 589
AC4 encoding for audio as defined in the various parts of ETSI TS 103 190
UHD, a resolution of 3840 pixels across by 2160 tall, also called "4K", as described in ITU-R Rec. BT.2020
non-UHD, a lower resolution, e.g., 1920 pixels across by 1080 tall (also called "HD"), as described in ITU-R Rec. BT.709, or less which appear as tokens representing the associated capability codes in ATSC 3.0 A/332. Various examples of capabilities expressions in compliance with A/332 are provided below and are designated as Capabilities Expression Example, herein abbreviated "CEE.n" where "n" is replaced by a number indicating a particular example number.

A first example of a capabilities expression in compliance with A/332, designated CEE.1, is:
CEE.1
(HEVC) or
(HEVC and SHVC) or
(HEVC and SL-HDR1) or
(HEVC and SHVC and SL-HDR1)
where the tokens mean the following:
HEVC represents the ability to decode an HEVC-encoded SDR base layer having some first resolution
(which is non-UHD unless elsewhere qualified).
SHVC represents the ability to decode an SHVC-encoded enhancement layer for producing, in conjunction with the base layer, a resulting video having resolution greater than that of the base layer (likewise non-UHD unless in a conjunction with the token "4K"), but otherwise similar video characteristics (e.g., in this case, 'SDR') and the implicit requirement to decode two video asset streams
SL-HDR1 represents the ability to reconstruct an HDR video presentation from an SDR video presentation.

The capabilities expression corresponding to CEE.1 represents the requirements for four different meaningful presentations available from a single broadcast as follows:
1) an HEVC-encoded SDR base layer at the first resolution,
2) an SHVC-encoded improved resolution SDR enhancement layer combined with a second HEVC-encoded SDR base layer (still no HDR requirement),
3) an HEVC-encoded SDR base layer with metadata for reconstruction to HDR,
4) an SHVC-encoded improved resolution SDR enhancement layer combined with a second HEVC-encoded SDR base layer (still no HDR requirement) with metadata for reconstruction to HDR If, in a different example, the terms in CEE. 1 containing SHVC were further conjoined to the token "4K", that would signal that the corresponding higher-resolution presentation produced would encode a UHD-resolution image (i.e., almost 4000 pixels across). Note that such capability codes neither mean nor require that a receiver must present the result in that format. The capability codes merely indicate that the receiver must be able to understand that format. For example, a TV might be decoding a 4K image, but using the content to populate a picture-in-picture region of the screen measuring nowhere near 4000 pixels across.

Regarding the capabilities expressions as defined in A/332 and used in the examples described herein, the expressions are actually presented in an A/332 announcement using post-fix notation. That is, for example, the conventional notation of "A and (B or C)" would be expressed as "A B C or and". While the former notation uses the more common and perhaps more human-readable in-fix notation, the notations are equivalently expressive and bidirectionally translatable without loss. The examples provided herein are presented using the in-fix notation for clarity, with occasional post-fix examples clearly identified. It will be clear to one skilled in the art that use of a particular notation is merely by way of example and not limiting in that various notations can be used appropriate or as called for in a particular situation including, e.g., pre-fix notation not shown herein.

In general, at least one example of an embodiment involves providing improved capabilities signaling, e.g., for ATSC 3.0 systems, and similar mechanisms in a way that is fully backward compatible with systems that do not implement such improvements.

In ATSC 3.0, a group of required capabilities (represented by tokens or codes) joined in a conjunction, herein called a 'capabilities term' or 'term' as mentioned above. A capabilities term corresponds to at least one meaningful presentation of the content. Multiple terms can be joined in a disjunction, and the aggregate is a capabilities expression as described in ATSC 3.0 A/332. Manipulations of the capability expression using the distributive property of such expressions (specifically, the distribution of conjunction over disjunction), can result in a more compact expression for more efficient transmission, but can be expanded as needed to recover the "disjunction of terms" form.

In general, at least one example of an embodiment provides signaling of additional content qualities beyond the mere requirement of a particular capability by repeating the corresponding capability code such that it appears more than once in the term when the capabilities expression is fully expanded. This mechanism is referred to herein as 'intensification'. Different degrees of intensification, i.e., how many times a particular capability code is present within a single, fully expanded term, may correspond to different content qualities.

In general, at least one example of an embodiment provides announcements for programs available now or in the future improved by reducing the occurrence of misleading or misconstrued signals. For example, just because a video signal is encoded using high dynamic range (HDR) technologies does not necessarily imply that the content of that video signal could not have been encoded using standard dynamic range (SDR) technologies. As a more specific example, an electronic program guide (EPG) might indicate, based on required capabilities, that a particular program is in HDR. However, if the content so represented is effectively SDR, the user or consumer can become confused, feel misled or deceived, and come away from the experience distrusting the EPG, which is, to them, clearly faulty. At least one example an embodiment described herein provides improved signaling so as to enable the guide to present better-quality information, thereby producing improved user satisfaction.

In general, at least one example of an embodiment provides improved announcements that can be used to improve filtering and selection of presentations, based on default preferences or user-supplied preferences. The same content distribution may be interpretable as one or more different meaningful presentations. Separately, the same content (e.g., a particular movie), might be available by way of different distributions, e.g., at different times or from different services, and each might be interpretable as still more different meaningful presentations. This allows an automated or semi-automated system to select for presentation or recording, whether immediate or future, the particular meaningful presentation likely to be most desirable for the user, based on the preferences or filter settings. Filter settings may be temporary, while someone is looking for content that exploits a particular technology (e.g., to 'show off' their fancy audio system), or such filter settings may be persistent (e.g., to not show any standard definition content unless there is no other version of that content available in the pertinent timeframe). A persistent filter setting may also be a preference. Preferences can be strictly resident on a device, but are preferably associated with a user account, such that the user preferences are available on any device when the user is present, e.g., mobile devices and hotel televisions. Preferences may be distinct for different classes of device, for example selecting the minimum data size as a preference for mobile devices, vs having the highest quality presentation for the home theater.

In general, at least one example of an embodiment provides for compressing capabilities expressions through the use of an additional operator, e.g., referred to herein as 'also' operator. An embodiment involving the 'also' operator might not be compatible with a particular system because the operator does not exist in the grammar expected by the system. However, at least one example of an embodiment involving the "also" operator is backwards compatible as will be described herein. For example, in at least one example of an embodiment described herein, the "also" operator will be properly ignored by systems that do not recognize the operator without affecting the correct interpretation of capabilities expressions so encoded.

In general, at least one example of an embodiment involves a mechanism for determining which of several presentations is superior. In one embodiment, a first meaningful presentation of a content is preferred to a second meaningful presentation of the content if the count of tokens in a first term corresponding to the first meaningful presentation exceeds the count of tokens in a second term corresponding to the second meaningful presentation. In another embodiment, a specific token can have a corresponding weight. In still another embodiment, a specific number of a specific token, i.e., a specific token with a particular degree of intensification, can have a corresponding weight. Weights can be predetermined or may be subject to user adjustment as a kind of preference.

The present disclosure may be better understood by considering the detailed description below along with the accompanying figure, designated FIG. 1, which shows an example of a system block diagram for a device or system, e.g. a content receiver, useful for illustrating one or more of the aspects, embodiments and features described herein. For ease of explanation, the example of a system illustrated in FIG. 1 will be referred to herein as a television or television receiver such as a digital television (DTV). However, the content receiver could be any type of electronic device receiving content including, but not limited to, a television or television receiver (e.g., DTV), a set-top box, a gateway device, an OTT device (e.g., Apple TV), a computer, a laptop, a mobile device such as a smart phone or tablet, content receiving or processing systems including one or more virtual components or completely based on virtual components (e.g., "in the cloud" such as a DVR feature provided by a head-end service), etc. In addition, "content", "content signal", or signal providing content" as referenced herein will, for ease of explanation and only as an example, generally be described as providing television content such as television programming, however "content" as used herein can refer to television signals or programming, video content, audio content, movies, etc. Thus, it should be understood that FIG. 1 is provided only as an example and is not necessarily the only possible configuration and, therefore, is not intended to be, and is not, limiting with regard to the various aspects, embodiments and features described herein.

In FIG. 1, program and service announcements 100 from one or more sources are provided to receiver 120 of the example television system 110, as described in ATSC 3.0 A/332 and related documents. In this example embodiment, received announcements are analyzed by a presentation prioritizer 130, e.g., on the basis of program quality preferences 132, which may be predetermined and/or user controlled and/or automatically determined and updated based on user behavior, e.g., a type of content such as HDR content that a user selects. At least a portion of the analysis is based on capabilities expressions as described herein. On the basis of the analysis, a processed announcement can be stored, e.g., in electronic program guide (EPG) data 140. In some cases, the processed announcement is enhanced to denote certain presentation or content characteristics as described below. In some cases, the processed announcement may be a redacted form of the original announcement, or, after analysis, the announcement may be omitted in its entirety and not stored in EPG data 140.

The processed announcements can provide improvements as described herein to EPG rendering 160 which provides the interactive presentation of the EPG to the user on display 170 (conventional interactive controls and control processes for user interaction with the EPG not shown). When the user selects from the EPG display a program to be immediately watched, the receiver 120 selects the corresponding service (not shown) based on the selected EPG data corresponding to the selected program so as to acquire the stream carrying that program from the service and the program is decoded (not shown) and presented on display 170. When the user selects from the EPG display a program to be recorded in the future, particularly on a recurring basis, the selection is noted in DVR selections 150. As announcements are being processed by presentation prioritizer 130, entries in DVR selections 150 are evaluated in the context of the program quality preferences 132 as described below and additional program selections for future recording are noted in DVR selections 150. Subsequently, at the corresponding presentation time for an entry in DVR selections 150, DVR triggering 152 automatically directs receiver 120 to access the corresponding service and program and record it in DVR recorded programs 154.

In at least one example of an embodiment, any or all elements of television system 110 except display 170 and corresponding interaction controls (not shown), including receiver 120, program quality preferences 132, and recorded programs 154, can be physically remote from proximity to the user, e.g., much of the system could be virtualized into the cloud.

Returning to the discussion above regarding example CEE.1, a content encoded using that combination of technologies, and SL-HDR1 in particular, with capabilities so described is likely to represent an actual HDR content, i.e., one that exploits the higher dynamic range and wider color gamut available using BT.2100. However, although likely, that is not strictly the case.

Another example of a capabilities expression is shown in CEE.2:

CEE.2
(HDR) or
(HDR and SHVC) or
(HDR and 2094-10) or
(HDR and SHVC and 2094-10)
where the tokens mean the following:
  HDR represents the ability to decode an HEVC-encoded HDR (PQ or HLG) base layer having some first resolution (non-UHD unless elsewhere qualified)
  SHVC represents SHVC-encoded enhancement layer for producing resolution greater than that of the base layer (likewise non-UHD unless in a conjunction with the token "4K"), but otherwise similar video characteristics (e.g., in this case, 'SDR') and the implicit requirement to decode two video asset streams
  2094-10 represents the ability to use presented metadata to adapt the HDR video to display capabilities
wherein the presence of the 2094-10 metadata may suggest that this content actually exploits the higher dynamic range and wider color gamut available using BT.2100, because otherwise there is no purpose to the metadata.

However, the situation can be less certain given other capabilities expressions. For example:

CEE.3
(HDR) or
(HDR and SHVC)
or even just
CEE.4
(HDR)

where the tokens are as defined above. In these examples, the content is encoded using PQ or HLG and the BT.2020 color space as prescribed in BT.2100, but there is the possibility that the content itself makes no significant excursions into the extended dynamic range of HDR or into the added color gamut of BT.2020. If the content originated as BT.709 (SDR & SCG) and was directly mapped into the BT.2100 transfer functions and color gamut so as to appear in its original form, then the content is SDR even though it is encoded in an HDR-capable format.

It would be a great disappointment to a viewer expecting an HDR presentation to receive an SDR presentation. It would be disingenuous to advertise such a program as HDR, yet if the encoding is interpreted to imply that the content is HDR, that is what will happen. One solution would be to explicitly signal that a content exploits capabilities beyond BT. 709. However, there is no 'requirement' imposed on the content, and there is no 'requirement' imposed on the receiver. The tokens and the combinations of them that appear in the capabilities expressions must evaluate to whether or not one of the video presentations described can be decoded and presented at all.

To introduce a token to represent "this HDR content does exploit HDR" or "this HDR content does not exploit HDR" does not represent a further capability requirement, because either is already supported by the HDR token already described. However, the ability to explicitly signal to a savvy electronic program guide that such is the case would be valuable, otherwise, programming having capabilities so communicated may mislead viewers seeking a true HDR presentation.

In general, at least one example of an embodiment involves explicitly announcing that an HDR encoded video content actually exploits dynamic range and/or color gamut in excess of BT.709 by conjoining additional instances of the HDR capabilities code (token). Such additional instances are referred to herein as an "intensifier". For example:

CEE.5
(HDR and HDR)
or where high resolution can be available:

```
CEE.6
(HDR and HDR) or
(HDR and HDR and SHVC) or
(HDR and SHVC and HDR)      # equivalent to the prior term
```

Or, as a specific example, even in cases where high resolution might otherwise be implied by metadata:

```
CEE.7
(HDR and HDR and 2094-10) or
(HDR and HDR and SHVC and 2094-10) or
(HEVC and SL-HDR1 and SL-HDR1) or
(SL-HDR1 and HEVC and SL-HDR1) or    # equivalent to the prior
                                       term
(HEVC and SHVC and SL-HDR1 and SL-HDR1) or
(SHVC and SL-HDR1 and SL-HDR1) or    # equivalent to the prior
                                       term, as HEVC
                                     # is a prerequisite to SHVC
(SL-HDR1 and SHVC and SL-HDR1)       # equivalent to either of
                                       the prior two
terms
``` though the presence of the metadata could be interpreted to imply that the content is authentically in HDR, as previously mentioned, the reiteration of the HDR token (or in the alternative, the 2094-10 token) or the SL-HDR1 token as shown represents an explicit signal that the content is exploiting the advantages of HDR over SDR, and/or WCG over SCG.

The same technique of repeating a token as an intensifier to signal actual use of enhancements available given a certain capability requirement could be used to signal degrees of use in an enhanced audio presentations as well. For example:

CEE.8
(AC4)

where AC4 is a token that represents a particular audio codec which is capable of a traditional stereo program, or a surround sound (e.g., 5.1) representation, or a much more immersive presentation. In general, an example of an embodiment of the described audio case can be illustrated as follows:

```
CEE.9
(AC4)                    # represents a stereo program
CEE.10
(AC4 and AC4)            # represent a program having surround
                           sound, e.g., 5.1
CEE.11
(AC4 and AC4 and AC4)    # a program having immersive sound
                           beyond 5.1
```

An advantage of replicating tokens as intensifiers is that any receiver, e.g., any television, that parses a token representing a required capability that it possesses can process the proposed replication. For example, logically, (X and X) reduces to (X) as does any number of conjoined Xs, regardless of any intervening conjoined tokens: (X and X and Q and X and R and S and X) logically reduces to (X and Q and R and S). However, a device capable of processing an expression implementing an intensifier feature as described herein, i.e., an 'intensifier-savvy' device, can be configured to highlight, give higher priority to, or otherwise indicate to a user that the program so characterized is expected to exploit a capability beyond the simplest form of content presented using that required capability.

One of the properties of the capabilities expressions as defined in A/332, when used to describe different meaningful presentations, is that the distributive property applies to such expressions. For example:

CEE.12
(HDR) or (HDR and 2094-10) or (HDR and SHVC and 2094-10)

is equivalent to:

CEE.13
HDR or (HDR and (2094-10 or (2094-10 and SHVC))

which provides an advantage comprising using fewer terms (i.e., one fewer instances of HDR), which saves space when representing the capabilities expression.

The described technique may not be necessary where the only difference between meaningful presentations is represented by intensifiers:

CEE.14
(HDR and AC4) or
(HDR and AC4 and AC4) or
(HDR and AC4 and AC4 and AC4) or
(HDR and HDR and AC4) or
(HDR and HDR and AC4 and AC4) or
(HDR and HDR and AC4 and AC4 and AC4)

because the nature of intensifiers allows them to more economically be represented. For example, CEE.14 can be reduced or collapsed to:

CEE.15
HDR and HDR and AC4 and AC4 and AC4

Such collapse is possible because there is no point to signaling the lesser interpretations explicitly: An intensifier-savvy recipient is aware of its capabilities and is reading the intensifiers for which of its capabilities the content can exploit.

An exception to that occurs if these different terms actually represent exercise of different presentation components. For example, if (HDR and AC4) represents a meaningful presentation of the content that uses an actual stereo audio element, that stereo audio element will be smaller in aggregate data size than the immersive element that (HDR and AC4 and AC4 and AC4) represents and is meaningfully different to a system that could decode an immersive AC4 element but only render that element in stereo. In such a case, the explicit signaling of a smaller sized representation of the audio track (e.g., stereo vs. immersive) might usefully be announced as:

HDR and (AC4 or AC4 and AC4 and AC4)

In the case of a program being offered using different formats, e.g., with audio both in AC4 and MPEG-H, a receiver would normally make use of whichever format it supports, and if both formats are supported, the receiver's own preference. However, a capabilities expression such as:

HDR and (AC4 or MPEG-H and MPEG-H)

could persuade the device to overcome its default preference and chose the format that is indicated by the program announcement as better exploiting audio capabilities. Of course, if the device recognizes that it cannot do justice to the intensified capability, then it might reasonably revert to its default preferences.

A further example, explicitly using the HDR token in the form of an intensifier to indicate where HDR-exploiting content is available might look like the following example (where the intensifier use of SL-HDR1 indicates that the reconstituted HDR actually exploits the HDR technology and is not merely SDR in an HDR container):

CEE.16
(HEVC) or
(HEVC and SHVC) or
(HEVC and SL-HDR1 and SL-HDR1)
(HEVC and SHVC and SL-HDR1 and SL-HDR)

which has 10 tokens, but can be written more economically as

CEE.17
(HEVC) or
(HEVC and SHVC) or
(SL-HDR1 and SL-HDR1) and (HEVC or (HEVC and SHVC))

which uses 8 tokens. If HEVC is taken as a prerequisite for SHVC, then the removal of HEVC in terms that contains SHVC reduces CEE.16 to 8 terms and CEE.17 to 6 terms.

In general, at least one other example of an embodiment provides for an operator referred to herein as 'also' operator, which enables certain expressions to be compressed into a more compact form. For example, CEE.18
A or (A and B) or (A and B and (C or D))

can be written more compactly using the 'also' operator as in the following example:

CEE.19
A also B also (C or D)

While the above example uses the in-fix form of the 'also' operator, a post-fix version is appropriate as illustrated in the following example:

CEE.20
A B C D or also

This represents a reduction from 7 tokens to 4. When applied to CEE.16, the compression is effective:

CEE.21
HEVC also (SHVC or ((SL-HDR1 and SL-HDR1) also SHVC))

which reduces 12 tokens to 5.

Another way to think about the also operator in the context of this capabilities expression is "if you can do A, good, and if you can also do B, better!, and if you also can do either C or D, fantastic!!"

However, adding a new operator to a grammar that is already fixed can be problematic. A/332 already presents a grammar that includes tokens and two operators: conjunction ('and') and disjunction ('or'). One resolution to this is to introduce a new capability code, "ALSO", a token that represents a device such as a television that understands the 'also operator' when used in the form of the following example:

CEE.22
A or ALSO and B where the sequence "or ALSO and" separates A from B such that a system that does not understand the ALSO token can successfully recognize whether it does meet the capability requirement represented by A, and for its non-recognition of ALSO, does not attempt anything with the conjoined B capability token. However, a system that does understand the ALSO token can expand the expression or otherwise operate to consider:
  CEE.23
  (A) or
  (A and B)
as intended by application of the also operator.

While it may appear that there is a disadvantage of adding an additional term for each also operator, there is an efficiency gain as illustrated by the following example based on example CEE.16:
  CEE.24
  HEVC or ALSO and (SHVC or (HDR and HDR and SL-HDR1) or ALSO and SHVC)
which produces a reduction of the 12 terms in CEE.16 to 8 terms in CEE.24.

When used in an electronic program guide (EPG) or other presentation of announcements of content to be listed for a user, any of the tokens, their conjoined combinations, including their intensified alternatives, can be used as the basis for an alternate presentation. For example, using the terms from the capabilities expression of CEE.14 as applied to a TV show named 'Endeavors':

| Capabilities term: | | EPG representation for content: |
|---|---|---|
| (HDR and AC4) | -> | " Endeavors " |
| (HDR and AC4 and AC4) | -> | ") Endeavors (" |
| (HDR and AC4 and AC4 and AC4) | -> | ")) Endeavors ((" |
| (HDR and HDR and AC4) | -> | " * Endeavors * " |
| (HDR and HDR and AC4 and AC4) | -> | ") * Endeavors * (" |
| (HDR and HDR and AC4 and AC4 and AC4) | -> | ")) * Endeavors * ((" | where the characters or designations in the "EPG representation for content" column provide examples of EPG indications such as the following:
  "->" is used here to mean " . . . could be used to produce a content listing like . . . "
  "*" around the title represents a presentation using content that exploits HDR
  ")" and "(" might represent one or more icons suggesting surround sound
  "))" and "((" might represent one or more icons suggesting immersive sound The listed designations or indications are merely examples. The use of text here is strictly for simplicity of communication by way of example and not limitation. The actual presentation could be semi-graphical in nature, with icons, or other graphical treatments or symbols.

Alternatively, or in addition, a different translation, i.e., correspondence to information provided in an EPG, could be in a form suited for consumption by a selection algorithm. For example:

| Capabilities term: | | EPG representation for content: |
|---|---|---|
| (HDR and AC4) | -> | Endeavors {stereo} |
| (HDR and AC4 and AC4) | -> | Endeavors {surround} |
| (HDR and AC4 and AC4 and AC4) | -> | Endeavors {immersive} |
| (HDR and HDR and AC4) | -> | Endeavors {stereo, hdr} |
| (HDR and HDR and AC4 and AC4) | -> | Endeavors {surround, hdr} |
| (HDR and HDR and AC4 and AC4 and AC4) | -> | Endeavors {immersive, hdr} |

| Capabilities term: | | EPG representation for content: |
|---|---|---|
| (HDR and SHVC and AC4 and AC4) | -> | Endeavors {surround, hdr, hd!} | where characteristics of the presentation are enclosed in { } and could be parsed based on priority. For example, a presentation in immersive is given higher priority than a surround or stereo presentation, or by a filtering system and/or based on preferences. In this case, the characteristics of "hdr" means that the announcement author wanted to emphasize the HDR images and "hd!" to emphasize the enhanced resolution version.

An example use could be a user who has a display fully capable of presenting dramatic HDR images and might have a preference for programs that exploit the HDR. Such a preference might be assumed or automatically established based on the characteristics of the display. Likewise, a user whose system is configured to fully exploit immersive audio would likely prefer programs that exercise that capability. To support such intuitive preferences most readily, particularly if the same program is available in different forms and perhaps from different services, then what would be most preferable presentations are suggested first.

Alternatively, the earliest available presentations might be suggested first, but with a flag indicating 'better' presentations are available in a later presentation. Also, a user could indicate other preferences, overriding the defaults globally or for a particular show or category of shows. For example, even though a user's system might be able to fully exploit high resolution images and immersive audio, there might be reasons to instead record the lower resolution presentations, perhaps in stereo, for example to conserve DVR storage in cases of capturing a marathon airing of an old TV series. For example, "Endeavors {stereo}" might represent the smallest format of the program, whereas "Endeavors {immersive, uhd}" might be much larger. Other things being equal, representations that produce {hdr}, including any that rely (or can rely) on metadata, e.g., SL-HDR1 or 2094-10, can be used to reconstruct or adapt HDR content, do not represent a large difference in data size and might not be used to differentiate based on memory size needed for storage or bandwidth needed to receive, whereas programs decoded using the SHVC or 4K capability codes would be expected to require more bandwidth and more storage.

One advantage of the encoding of content properties as capability requirements is that it is more compact and more efficient that discretely signaling the properties for each arrangement of content that is offered.

In ATSC 3.0 A/332, the order of capability codes within a capabilities expression is not significant, but the author of the announcement could intend order to have meaning. For example:
  "(HDR and HDR and AC4 and AC4 and AC4)"
could indicate that while this content does exploit immersive audio, the picture in HDR, is perhaps more exceptional, whereas "(AC4 and AC4 and AC4 and HDR and HDR)" signals the opposite. In fact, when the interpretation of capability codes that are intensified is that they are not less intensified whether they are adjacent or not. That is, for example:
  "(HDR and AC4 and HDR)"="(AC4 and HDR and HDR)"

both signal the same degree of intensification, the ordering can be use separately to signal what, if any aspect of the content is most notable.

In general, at least one example of an embodiment can involve, for those terms for which a system is able to fully qualify (e.g., the four terms comprising each of the rows in CEE.16, or the corresponding expansion using the distributive property of CEE.17), the presentation corresponding to the term having more tokens is the superior presentation. In cases where intensification is used for certain capability codes, but a receiving system recognizes that it is not able to fully exploit such a capability, then any tokens representing an excess intensification, beyond that which is going to contribute to the user experience, need not be counted. For example, consider CEE.16:

CEE.16

(HEVC) or (HEVC and SHVC) or (HEVC and SL-HDR1 and SL-HDR1)

(HEVC and SHVC and SL-HDR1 and SL-HDR)

wherein the first row has only one token and the last row has four tokens. However, if the receiving system does not have one or more of the capabilities represented by the last three tokens in the last row, the last row is not considered at all. If row 4 were not present, and the system otherwise had all the capability for each of the tokens present, the presentation represented by the third row would be considered the superior presentation, with the HDR reconstruction offered by SL-HDR1 outweighing with its two tokens the higher resolution offered by the one SHVC token in the second row. If the resolution was considered by the announcement author to be of particular interest, then the SHVC capability code could be intensified (i.e., replicated). Given that (HEVC and SHVC and SHVC) has the same token count as (HEVC and SL-HDR1 and SL-HDR1), the system could give deference to the earlier occurring term, in which case the author of the announcement determines the priority, or the tie could go to a user preference, e.g., colorfulness and dynamic range (i.e., HDR as reconstructed from SL-HDR1) over higher resolution (as produced by SHVC).

In another example of an embodiment, terms can be weighted, with differently intensified terms further receiving different weighting. For example, SHVC (representing higher resolution) might be given a weight of 2, whereas intensified SHVC (representing content that makes exceptional use of higher resolution) might be weighted 3. SL-HDR1, representing the ability to reconstruct for an otherwise SDR content an HDR presentation, might itself be weighted 3, whereas an intensified SL-HDR1 might be weighted 4. Weights can be provided as defaults, but may also be adjusted in accordance with user preferences such as by direct manipulation by the user in the UI and/or automatically established or modified based on system capabilities (e.g., display capabilities) and/or modified or updated based on a history of user selections of content.

In another embodiment, intensification can use a different form. A particular token can be defined to represent a degree of intensification, e.g., "3×" or "4×" for an associated token, so that rather than explicit replication, the token representing the degree is presented. In order to remain backward compatible with implementations that do not under intensification degree tokens, the tokens are combined in a disjunction:

```
CEE.26
HEVC and (AC4 and AC4 and AC4)
CEE.27
HEVC and (AC4 or 3X)          # equivalent to the above for a
                              # "degree token aware" interpreter
# (HEVC and AC4) or (HEVC     meaning to an interpreter that does not
and 3X)
                              # understand degree tokens, where the
                              # second term evaluates to FALSE
```

The advantage of encoding that use degree tokens such as "3×", which in ATSC 3.0 would preferably be defined as a predetermined capability code and a receiver that understands such codes can see the disjunction, recognize that one of the tokens in the disjunction is a degree token, and treat that in the same way as if the corresponding number of capability codes (the other token) had been conjoined. Encoding using degree tokens offers a further degree of compression for the capabilities expression, illustrated by CEE.27 being more compact than CEE.26. A receiver that does not recognize the degree token merely considers it to be a capability the receiver does not possess, and interprets that capability as being FALSE. In the expanded version of CEE.27, the second term "HEVC and 3×" would thus evaluate to false, while the first term depends on the receiver's actual capabilities and thus the expression in CEE.27 is backwards compatible to legacy devices.

Another interpretation of such degree tokens is that they can serve as an index into a table of special meanings. For example, the AC4 token might have a predetermined list of configurations, each signaled by a different degree token (e.g., 2×=5.1, 3×=7.1, 4×=9.2, 5×=15.2, etc.). In such a scenario, a degree token could represent a single implementation, but multiple degree tokens could be applied to a single capability code that would represent discrete presentations as suggested by CEE.28.

```
CEE.28
HEVC and (AC4 or 2x or 4x)        # expands to three terms
```

In the case of a system that understands one or both of the degree codes in the context of AC4, the capabilities expression of CEE.28 expands to three terms, (HEVC and AC4), which would be evaluated by any legacy system, which would evaluate the other terms to FALSE, but also (HEVC and AC4@2), in which the "@2" represents the AC4 technology requirement of degree 2, which per the examples above corresponds to an audio characteristic of "5.1" and the (HEVC and AC4@4) corresponds to an audio characteristic of "9.2". This makes for every economical presentations of related content attributes, while not affecting legacy computations related to minimum required capabilities.

User preferences, including those represented as weights, can be, in at least one example of an embodiment, stored locally on the TV set or set-top box. In at least one other example of an embodiment, such user preferences are stored in conjunction with a user account, such that the preferences can be applied by any device to which a user or the account has been identified. In still another example embodiment, user preferences may be separately tracked on the basis of device type, for example, preferences apropos to a home theater might be kept distinct from those apropos to a mobile device or preferences to be used by a hotel TV when the user is traveling.

As another example of at least one embodiment, during a period where a user is acclimating to the capabilities of a new television, the user interface might occasionally inquire as to which aspect(s) of a recent presentation is/are most impressive. While for certain contents, the expected response might be confidently predicted (e.g., an unexceptional stereo soundtrack might not be expected to compete with an award-winning HDR image), in cases where the expected response is more evenly distributed, the result can be used to incrementally estimate the user's taste which becomes the basis for future assessments of user preference.

Figure 2:
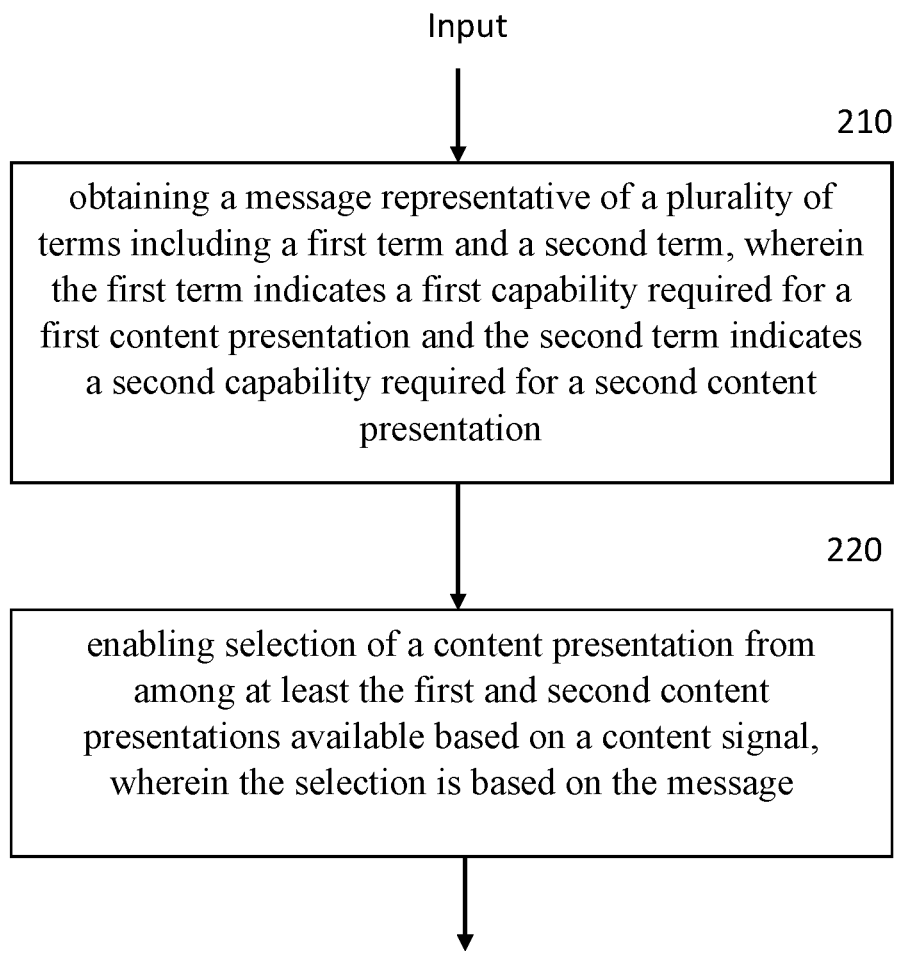
FIG. 2 illustrates, in flow diagram form, another example of an embodiment.

Another example of an embodiment is illustrated in FIG. 2. In FIG. 2, embodiment 200 comprises obtaining, at 210, a message representative of a plurality of terms including a first term and a second term, wherein the first term indicates a first capability required for a first content presentation and the second term indicates a second capability required for a second content presentation. Examples of such a message can be found in one or more of the CE message examples (CEE.n) described above. Then, embodiment 200 further comprises, at 220, enabling selection of a content presentation from among at least the first and second content presentations available based on a content signal, wherein the selection is based on the message. Embodiment 200 might be implemented, for example, in a television or other electronic device for providing or rendering a content presentation such as a television program in a particular format, e.g., HDR with surround sound. A variant of embodiment 200 can involve producing a message representative of a plurality of terms and making the message available (e.g., including the message with content in a television broadcast or with streaming content).

Another example of an embodiment is illustrated in FIG. 3. In FIG. 3, embodiment 300 includes obtaining, at 310, a message including a capabilities expression comprising a plurality of capabilities terms, wherein each capabilities term corresponds to one of a plurality of presentation modes for presenting a content, and each capabilities term includes a plurality of capabilities tokens, wherein each capabilities term indicates, based on the plurality of capabilities tokens, a requirement for presenting the content in accordance with a corresponding one of the plurality of presentation modes. Examples of such a message can be found in one or more of the CE message examples (CEE.n) described above. Then, at 320, embodiment 300 further comprises compressing the capabilities expression to reduce at least one of a number of the capabilities terms or a number of the capabilities tokens included in the capabilities expression. The compression can be based on including at least one of an operator or an intensifier in the message. An example of an operator providing compression is the "ALSO" operator described above, e.g., with regard to example CEE.19. Examples of an intensifier include repeating a particular token, e.g., see CEE.10 and CEE.11, and defining a particular token that can replace a plurality of repeated tokens, e.g., see CEE.27. The message and the compressed capabilities expression enable determining one of the plurality of presentation modes for presenting a content as described herein. Variants of embodiment 300 can include producing a message including a compressed capabilities expression and making the message available (e.g., including the message with a compressed capabilities expression in a television broadcast or with streaming content). Alternatively, a device receiving and storing a message including a capabilities expression, e.g., from a broadcaster, can process the expression to perform the compression, thereby reducing storage requirements for the message.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Figure 4:
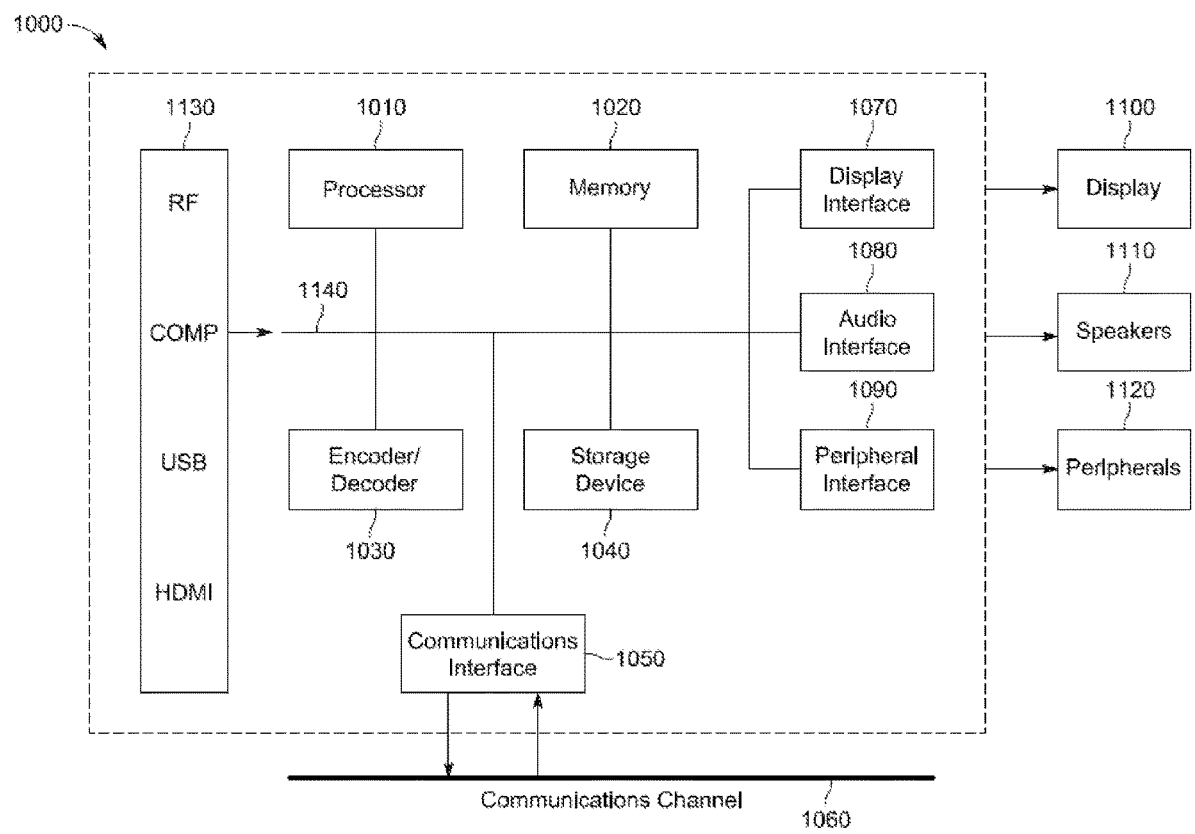
FIG. 4 illustrates, in block diagram form, another example of an embodiment.

In general, the examples of embodiments described and contemplated in this document can be implemented in many different forms. Several examples are illustrated in FIGS. 1 to 3 as described above. Another example is illustrated in FIG. 4 described below. Other embodiments are contemplated, and the examples shown in the Figures do not limit the breadth of the implementations. The various examples of embodiments described herein can be implemented as a method, an apparatus, a computer readable storage medium or non-transitory computer readable storage medium having stored thereon instructions for implementing one or more of the examples of methods described herein.

Various methods are described herein, and each of the methods comprises one or more steps or actions for achieving the described method. Unless a specific order of steps or actions is required for proper operation of the method, the order and/or use of specific steps and/or actions may be modified or combined.

Various embodiments, e.g., methods, and other aspects described in this document can be used to modify a system such as the example shown in FIG. 4 that is described in detail below. For example, one or more devices, features, modules, etc. of the example of FIG. 4, and/or the arrangement of devices, features, modules, etc. of the system (e.g., architecture of the system) can be modified. Unless indicated otherwise, or technically precluded, the aspects, embodiments, etc. described in this document can be used individually or in combination.

Various numeric values are used in the present document, for example. The specific values are for example purposes and the aspects described are not limited to these specific values.

FIG. 4 illustrates a block diagram of an example of a system in which various aspects and embodiments can be implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 can include an encoder/decoder module 1030 configured, for example, to process image data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during operations such as those described herein. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Regarding the various embodiments described herein and the figures illustrating various embodiments, when a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, one or more of a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

providing for enabling a selection of a content presentation from among at least first and second content presentations available based on a content signal, wherein the selection is based on a message representative of a plurality of terms including a first term and a second term, and the first term indicates a first capability required for the first content presentation, and the second term indicates a second capability required for the second content presentation;

providing for enabling a selection of a content presentation from among at least first and second content presentations available based on a content signal, wherein the selection is based on a message representative of a plurality of terms including a first term and a second term, and the first term indicates a first capability required for the first content presentation, and the second term indicates a second capability required for the second content presentation, and wherein at least one of the first and second terms is representative of a plurality of codes including at least a first code and a second code, wherein the first and second codes are associated with indicating the required capability;

providing for enabling a selection of a content presentation from among at least first and second content presentations available based on a content signal, wherein the selection is based on a message representative of a plurality of terms including at least a first term and a second term, and the first term indicates a first capability required for the first content presentation, and the second term indicates a second capability required for the second content presentation; and wherein at least one of the first and second terms is representative of a plurality of codes including at least a first code and a second code, the first and second codes are associated with indicating the required capability, and the first and second codes being the same indicates a characteristic of the one of the first and second content presentations associated with the one of the first and second terms including the first and second codes being the same;

providing for enabling a selection of a content presentation from among at least first and second content presentations available based on a content signal, wherein the selection is based on a message representative of a plurality of terms including at least a first term and a second term, and the first term indicates a first capability required for the first content presentation, and the second term indicates a second capability required for the second content presentation; and wherein at least one of the first and second terms is representative of a plurality of codes including at least a first code and a second code, and wherein the first and second codes are associated with indicating the required capability, and the first and second codes being the same indicates a characteristic of the content presentation associated with the one of the first and second terms including the first and second codes being the same, and wherein a user preference is associated with the characteristic;

providing for enabling a selection of a content presentation from among at least first and second content presentations available based on a content signal, wherein the selection is based on a message representative of a plurality of terms including a first term and a second term, and the first term indicates a first capability required for the first content presentation, and the second term indicates a second capability required for the second content presentation, and wherein at least one of the first and second terms is representative of a plurality of codes associated with indicating the required capability, and wherein two or more of the plurality of codes being the same indicates a characteristic of the one of the first and second content presentations associated with the one of the first and second terms including the two or more of the plurality of codes being the same;

providing for enabling a selection of a content presentation from among at least first and second content presentations available based on a content signal, wherein the selection is based on a message representative of a plurality of terms including at least a first term and a second term, and the first term indicates a first capability required for the first content presentation, and the second term indicates a second capability required for the second content presentation; and wherein at least one of the first and second terms is representative of a plurality of codes associated with indicating the required capability, and wherein two or more of the plurality of codes being the same indicates a characteristic of the one of the first and second content presentations associated with the one of the first and second terms including the two or more of the plurality of codes being the same, and wherein a user preference is associated with the characteristic;

providing for determining one of a plurality of presentation modes for presenting a content, wherein the determining is based on a capabilities announcement including a capabilities expression comprising a plurality of capabilities terms, and each capabilities term corresponds to one of the plurality of presentation modes, and each capabilities term includes at least one capabilities token, and each capabilities term indicates, based on the at least one capabilities token, a requirement for presenting content in accordance with a corresponding one of the plurality of presentation modes, and wherein the capabilities expression can be compressed to reduce a number of capabilities terms or a number of capabilities tokens included in the capabilities expression;

providing for determining one of a plurality of presentation modes for presenting a content, wherein the determining is based on a capabilities announcement including a capabilities expression comprising a plurality of capabilities terms, and each capabilities term corresponds to one of the plurality of presentation modes, and each capabilities term includes at least one capabilities token, and each capabilities term indicates, based on the at least one capabilities token, a requirement for presenting content in accordance with a corresponding one of the plurality of presentation modes, and wherein the capabilities expression can be compressed to reduce a number of capabilities terms or a number of capabilities tokens included in the capabilities expression, wherein the compression is based on at least one of a distributive property or an "also" operator which performs as a disjunction-like conjunction;

providing for determining one of a plurality of presentation modes for presenting a content, wherein the determining is based on a capabilities announcement as described herein, wherein a modification of information included in an electronic program guide is based on the capabilities announcement;

providing for determining one of a plurality of presentation modes for presenting a content, wherein the determining is based on a capabilities announcement as described herein, wherein a modification of information included in an electronic program guide is based on the capabilities announcement, and the modification comprises at least one of a filtering of information in the electronic program guide based on capabilities requirements indicated in the capabilities announcement or a change of an indicator in the program guide;

providing for selecting content comprising determining whether a content is presentable by a television, wherein an announcement comprises a first set of first capabilities required for a first presentation of the content, the determining is based on a set of capabilities of the television, the first presentation being presentable if the set of capabilities of the television includes each of the first capabilities and not otherwise; allowing selection of the content on the basis of whether the first presentation is presentable.

providing for selecting content based on an announcement as described herein, wherein the announcement further comprises a second set of second capabilities required for a second presentation of the content, the second presentation being presentable if the set of capabilities of the television includes each of the second capabilities and not otherwise; and, the allowing selection of the content is further based on whether the second presentation is presentable.

providing for selecting content based on an announcement as described herein, wherein the announcement further comprises a second set of second capabilities required for a second presentation of the content, the second presentation being presentable if the set of capabilities of the television includes each of the second capabilities and not otherwise, and the allowing selection of the content is further based on whether the second presentation is presentable, and not selecting from the first presentation and the second presentation if none of the first and second presentations is presentable, selecting the first presentation if only the first presentation is selectable, selecting the second presentation if only the second presentation is selectable, and selecting the first presentation on the basis of at least one priority determined from a first capabilities term corresponding to the first presentation in the announcement and a second capabilities term corresponding to the second presentation in the announcement;

providing for selecting content based on an announcement as described herein, wherein the announcement lists the content on a plurality of services, the first and second presentations correspond to different services, and the first and second capabilities terms are each represented in corresponding capabilities expressions;

providing for selecting content based on an announcement as described herein, wherein the announcement lists the content on a plurality of services, the first and second presentations correspond to a same title or program and to different services, and the first and second capabilities terms are each represented in corresponding capabilities expressions;

providing for selecting content based on an announcement as described herein, wherein the announcement lists the content at a plurality of times, the first and second presentations correspond to different times, and the first and second capabilities terms are each represented by corresponding capabilities expressions;

providing for selecting content based on an announcement as described herein, wherein the announcement lists the content at a plurality of times, the first and second presentations correspond to a same title or program and to different times, and the first and second capabilities terms are each represented by corresponding capabilities expressions;

providing for selecting content based on an announcement as described herein, wherein the announcement provides a capabilities expression for the content, and the first and second capabilities terms are each represented by the capabilities expression;

providing for selecting content based on an announcement as described herein, wherein one or more priorities are based on at least a number of capability codes each term comprises, and the first capabilities term comprises more capabilities codes than the second capabilities term;

providing for selecting content based on an announcement as described herein, wherein one or more priorities are based on at least a number of capability codes each term comprises, and the first capability term comprises the same number of capability codes as does the second capabilities term, and a priority assigned to one capability code that appears in the first capability term is higher than any priority assigned to any capability code that appears in the second capability term;

providing for selecting content based on an announcement as described herein, wherein the priority assigned to the one capability code is selected from a default, or a preference of the television, or a preference of the service owner, or a preference of the announcement author, or a preference from a user account, or a preference of the user;

providing for selecting content based on an announcement as described herein, wherein every capability code has a corresponding weight, the priorities are based on a sum for each term of the capability code weights, and the sum of weights for the capability codes in the first capabilities term is greater than the sum of weights for the capability codes in the second capabilities term;

providing for selecting content based on an announcement as described herein, wherein the at least one weight is one selected from a default, or a preference of the television, or a preference of the service owner, or a preference of the announcement author, or a preference from a user account, or a preference of the user;

providing for selecting content based on an announcement as described herein, wherein every capability code has a corresponding weight, the priorities are based on a sum for each term of the capability code weights, the sum of weights for the capability codes in the first capabilities term is same as the sum of weights for the capability codes in the second capabilities term, and a priority assigned to one capability code that appears in the first capability term is higher than any priority assigned to any capability code that appears in the second capability term;

providing for selecting content based on an announcement as described herein, wherein the priority assigned to the one capability code is one selected from a default, or a preference of the television, or a preference of the service owner, or a preference of the announcement author, or a preference from a user account, a preference of the user.

providing for selecting content based on an announcement as described herein, wherein the announcement further comprises a second set of second capabilities required for a second presentation of the content, the second presentation being presentable if the set of capabilities of the television includes each of the second capabilities and not otherwise, and the allowing selection of the content is further based on whether the second presentation is presentable, and not selecting from the first presentation and the second presentation if none of the first and second presentations is presentable, selecting the first presentation if only the first presentation is selectable, selecting the second presentation if only the second presentation is selectable, and selecting the first presentation on the basis of at least one priority determined from a first capabilities term corresponding to the first presentation in the announcement and a second capabilities term corresponding to the second presentation in the announcement, and further comprising one of playing, recording, and scheduling a recording of any presentation selected;

providing for selecting content based on an announcement as described herein, wherein the announcement further comprises a second set of second capabilities required for a second presentation of the content, the second presentation being presentable if the set of capabilities of the television includes each of the second capabilities and not otherwise, and the allowing selection of the content is further based on whether the second presentation is presentable, and not selecting from the first presentation and the second presentation if none of the first and second presentations is presentable, selecting the first presentation if only the first presentation is selectable, selecting the second presentation if only the second presentation is selectable, and selecting the first presentation on the basis of at least one priority determined from a first capabilities term corresponding to the first presentation in the announcement and a second capabilities term corresponding to the second presentation in the announcement, and further comprising presenting an electronic program guide (EPG) to a user based on the announcement, with the content represented in the EPG in accordance with capability codes of the capabilities term corresponding to the presentation selected, if any, otherwise with the content being one of not represented in the EPG and represented in the EPG as an unpresentable content.

Creating and/or transmitting and/or receiving and/or decoding a bitstream or signal that includes information in accordance with one or more of the examples of embodiments described herein, or variations thereof;

A TV, set-top box, cell phone, tablet, or other electronic device that provides for processing and/or applying capabilities messaging in accordance with any of the embodiments, features or entities, alone or in any combination, as described herein;

A TV, set-top box, cell phone, tablet, or other electronic device that performs processing and presentation of content according to any of the embodiments, features or entities, alone or in any combination, as described herein, and that displays (e.g. using a monitor, screen, or other type of display) a resulting image;

A TV, set-top box, cell phone, tablet, or other electronic device that tunes (e.g. using a tuner) a channel to receive a signal including control information and content, and processes the control information to present content according to any of the embodiments, features or entities, alone or in any combination, as described herein;

A TV, set-top box, cell phone, tablet, or other electronic device that receives (e.g. using an antenna) a signal over the air that includes control information and content, and processes the control information to present content according to any of the embodiments, features or entities, alone or in any combination, as described herein;

A computer program product storing program code that, when executed by a computer causes the computer to operate in accordance with any of the embodiments, features or entities, alone or in any combination, as described herein;

A non-transitory computer readable medium including executable program instructions causing a computer executing the instructions to implement any of the embodiments, features or entities, alone or in any combination, as described herein.

Various other generalized, as well as particularized embodiments are also supported and contemplated throughout this disclosure.

What is claimed:

1. A method performed by an apparatus for receiving digital content, the method comprising:

receiving a service announcement message from a content provider corresponding to the digital content, the service announcement message including a first term comprising at least one first capability code and indicating a first capability required to decode a first format of the digital content for a first presentation quality, and a second term comprising at least one second capability code and indicating a second capability required to decode a second format of the digital content for a second presentation quality, wherein at least the first capability code is intensified by a repetition of the first capability code or by a degree token associated with the first capability code, to indicate that the first presentation quality has a higher priority than the second presentation quality;

determining whether at least one of the first capability to decode and the second capability to decode respective formats of the digital content are available in the apparatus; and selecting at least one of the first format of the digital content and the second format of the digital content to present in an electronic program guide representing the digital content, the selection based on the determining, the indication that the first presentation quality has a higher priority than the second presentation quality, and one or more of an apparatus format preference and a user preference.

2. The method of claim 1, wherein the apparatus format preference comprises at least one preferred format supported by the apparatus, wherein the selection is one of the first format and the second format having the preferred format.

3. The method of claim 1, wherein the user preference comprises at least one preferred format selected by a user, wherein the preferred format is supported by the apparatus, and the selection is one of the first format and the second format having the preferred format.

4. The method of claim 1, wherein the first term comprises a plurality of first capability codes, each being associated with a weight, and the second term comprises a plurality of second capability codes, each being associated with a weight, the method further comprising:

determining, based on a sum of weights for capability codes in the first term and based on a sum of weights for capability codes in the second term, one or more priorities associated with a quality of the digital content;

wherein the selection is further based on the one or more priorities.

5. The method of claim 4, wherein the weights are determined based on at least one of a default value, a capability of the apparatus, an input to a user interface, or a history of user selections of content.

6. The method of claim 4, wherein a term having a higher sum has a higher priority than a term having a lower sum.

7. The method of claim 1, wherein the service announcement message includes an indication that the second term is further conjoined with the first term to determine the second capability.

8. The method of claim 7, wherein the indication comprises a capability code of the second term.

9. The method of claim 8, further comprising:

determining a priority for each term, based on at least a number of instances of a capability code that a term contains, wherein a term having a higher number of instances of the capability code has a higher priority than a term having a lower number of instances of a capability code;

wherein the selection is further based on the priority of the terms.

10. An apparatus comprising:

one or more processors configured to:

receive a service announcement message from a content provider corresponding to digital content, the service announcement message including a first term comprising at least one first capability code and indicating a first capability required to decode a first format of the digital content for a first presentation quality, and a second term comprising at least one second capability code and indicating a second capability required to decode a second format of the digital content for a second presentation quality, wherein at least the first capability code is intensified by a repetition of the first capability code or by a degree token associated with the first capability code, to indicate that the first presentation quality has a higher priority than the second presentation quality;

determine whether at least one of the first capability to decode and the second capability to decode respective formats of the digital content are available in the apparatus; and select at least one of the first format of the digital content and the second format of the digital content to present in an electronic program guide representing the digital content, the selection based on the determining, the indication that the first presentation quality has a higher priority than the second presentation quality, and one or more of an apparatus format preference and a user preference.

11. The apparatus of claim 10, wherein the first term comprises a plurality of first capability codes, each being associated with a weight, and the second term comprises a plurality of second capability codes, each being associated with a weight, the one or more processors being further configured to:

determine, based on a sum of weights for capability codes in the first term and based on a sum of weights for capability codes in the second term, one or more priorities associated with a quality of the digital content;

wherein the selection is further based on the one or more priorities.

12. The apparatus of claim 11, wherein the weights are determined based on at least one of a default value, a capability of the apparatus, an input to a user interface, or a history of user selections of content.

13. The apparatus of claim 11, wherein a term having a higher sum has a higher priority than a term having a lower sum.

14. The apparatus of claim 10, wherein the service announcement message includes an indication that the second term is further conjoined with the first term to determine the second capability, wherein the indication comprises a capability code of the second term.

15. The apparatus of claim 10, wherein the apparatus is a television, a set-top box, a cell phone, or a tablet computer.

16. A non-transitory computer-readable storage medium comprising instructions, which when executed by a processor, performs a method for receiving digital content, the method comprising:

receiving a service announcement message from a content provider corresponding to the digital content, the service announcement message including a first term comprising at least one first capability code and indicating a first capability required to decode a first format of the digital content for a first presentation quality, and a second term comprising at least one second capability code and indicating a second capability required to decode a second format of the digital content for a second presentation quality, wherein at least the first capability code is intensified by a repetition of the first capability code or by a degree token associated with the first capability code, to indicate that the first presentation quality has a higher priority than the second presentation quality;

determining whether at least one of the first capability to decode and the second capability to decode respective formats of the digital content are available in an apparatus; and selecting at least one of the first format of the digital content and the second format of the digital content to present in an electronic program guide representing the digital content, the selection based on the determining, the indication that the first presentation quality has a higher priority than the second presentation quality, and one or more of an apparatus format preference and a user preference.

17. The non-transitory computer-readable storage medium of claim 16, wherein the apparatus format preference comprises at least one preferred format supported by the apparatus, wherein the selection is one of the first format and the second format having the preferred format.

18. The non-transitory computer-readable storage medium of claim 16, wherein the user preference comprises at least one preferred format selected by a user, wherein the preferred format is supported by the apparatus, and the selection is one of the first format and the second format having the preferred format.

19. The non-transitory computer-readable storage medium of claim 16, wherein the first term comprises a plurality of first capability codes, each being associated with a weight, and the second term comprises a plurality of second capability codes, each being associated with a weight, the method further comprising:

determining, based on a sum of weights for capability codes in the first term and based on a sum of weights for capability codes in the second term, one or more priorities associated with a quality of the digital content;

wherein the selection is further based on the one or more priorities.

20. The non-transitory computer-readable storage medium of claim 19, wherein the weights are determined based on at least one of a default value, a capability of the apparatus, an input to a user interface, or a history of user selections of content.

* * * * *